UNITED STATES PATENT OFFICE.

ALBERT MUNDER, OF PHILADELPHIA, PENNSYLVANIA.

DETERGENT OR COMPOUND FOR REMOVING PAINT.

SPECIFICATION forming part of Letters Patent No. 271,901, dated February 6, 1883.

Application filed October 23, 1882. (No specimens.)

*To all whom it may concern:*

Be it known that I, ALBERT MUNDER, a subject of the Emperor of Germany, residing at Philadelphia, in the county of Philadelphia and State of Pennsylvania, have invented a certain new and useful Detergent or Compound for Removing Paint; and I do hereby declare the following to be a full, clear, and exact description of the invention.

My invention relates to a novel detergent compound or preparation for the removal of paint from wood or other surfaces, and is designed to be used as a substitute for the usual method of effecting such removal by burning or blistering.

The compound or preparation consists of the following ingredients, in or about the given proportions, viz: one gallon of water, two pounds of caustic soda, one ounce of aqua-ammonia. These materials, being combined, form a fluid mixture or compound, which is applied to the painted surface by means of a brush or other suitable utensil. The result is an immediate dissolution or disintegration of the paint, which may then be removed by wiping or scraping, leaving a smooth clean surface suited to the reception of new paint.

I am aware that a toilet-soap has been patented in which sal-ammoniac or ammoniacal liquor and caustic soda in certain parts have been used as a portion of said compound, and I do not, therefore, broadly claim the use of ammonia and caustic soda in combination.

What I claim as new is—

As a new article of manufacture for removing paint, &c., a composition of water, caustic soda, and aqua-ammonia, in the proportions of one gallon of water to two pounds of caustic soda and one ounce of aqua-ammonia.

In testimony that I claim the foregoing I have hereunto set my hand this 17th day of October, 1882.

ALBERT MUNDER.

Witnesses:
F. T. CLARK,
M. D. CONNOLLY.